United States Patent
Ardö et al.

(10) Patent No.: US 10,820,010 B2
(45) Date of Patent: Oct. 27, 2020

(54) METHODS AND DEVICES FOR ENCODING A VIDEO STREAM USING A FIRST AND A SECOND ENCODER

(71) Applicant: Axis AB, Lund (SE)

(72) Inventors: Björn Ardö, Lund (SE); Toivo Henningsson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/804,023

(22) Filed: Feb. 28, 2020

(65) Prior Publication Data

US 2020/0304825 A1 Sep. 24, 2020

(30) Foreign Application Priority Data

Mar. 19, 2019 (EP) .................................... 19163607

(51) Int. Cl.
| | |
|---|---|
| *H04N 19/172* | (2014.01) |
| *H04N 19/182* | (2014.01) |
| *H04N 19/139* | (2014.01) |
| *H04N 19/513* | (2014.01) |
| *H04N 19/105* | (2014.01) |

(52) U.S. Cl.
CPC ......... *H04N 19/513* (2014.11); *H04N 19/105* (2014.11); *H04N 19/139* (2014.11); *H04N 19/172* (2014.11); *H04N 19/182* (2014.11)

(58) Field of Classification Search
CPC .................................................... H04N 19/513
See application file for complete search history.

(56) References Cited

U.S. PATENT DOCUMENTS

| | | | |
|---|---|---|---|
| 8,824,553 B2 * | 9/2014 | Ameres | H04N 19/114 |
| | | | 375/240.16 |
| 8,873,625 B2 | 10/2014 | Goel | |
| 9,332,279 B2 * | 5/2016 | Lundberg | H04N 19/593 |
| 9,788,006 B2 * | 10/2017 | Lee | H04N 19/51 |
| 9,961,345 B2 | 5/2018 | Rossato et al. | |
| 10,034,026 B2 | 7/2018 | Subramaniam et al. | |
| 10,070,139 B2 * | 9/2018 | Roh | H04N 19/16 |
| 10,165,290 B2 * | 12/2018 | Lundberg | H04N 19/52 |
| 10,277,901 B2 * | 4/2019 | Danielsson Fan ... | H04N 19/177 |
| 10,313,680 B2 * | 6/2019 | Sullivan | H04N 19/105 |
| 10,511,769 B2 * | 12/2019 | Edpalm | H04N 5/23238 |
| 10,587,891 B2 * | 3/2020 | Zhou | H04N 19/523 |
| 10,616,592 B2 * | 4/2020 | Edpalm | H04N 19/70 |
| 10,652,538 B2 * | 5/2020 | Pihl | H04N 19/122 |

(Continued)

FOREIGN PATENT DOCUMENTS

WO 2017/195554 A1 11/2017

*Primary Examiner* — Irfan Habib
(74) *Attorney, Agent, or Firm* — Xsensus LLP

(57) ABSTRACT

The present invention relates to the field of image encoding. In particular, it relates to methods and devices where the concept of auxiliary frames may be employed to reduce or remove the need of copying data, for reference encoding purposes, between encoders which encode different parts of an image frame. This purpose is achieved by spatially modifying (S104) original image data before encoding (S106, S108) it using the encoders, and using (S110) the encoded image data as image data of an auxiliary frame. The auxiliary frame is referenced by an inter frame comprising motion vectors corresponding to a restoration of the auxiliary frame image data back to a spatial arrangement of the original image data.

16 Claims, 8 Drawing Sheets

(56) References Cited

U.S. PATENT DOCUMENTS

| | | | |
|---|---|---|---|
| 10,652,541 B2* | 5/2020 | Gisquet | H04N 19/124 |
| 10,687,028 B2* | 6/2020 | Siann | H04N 5/225 |
| 10,735,733 B2* | 8/2020 | Gisquet | H04N 19/124 |
| 2004/0120398 A1* | 6/2004 | Zhang | H04N 19/172 |
| | | | 375/240.03 |
| 2009/0245374 A1* | 10/2009 | Hsu | H04N 19/573 |
| | | | 375/240.16 |
| 2010/0061447 A1* | 3/2010 | Tu | H04N 19/51 |
| | | | 375/240.03 |
| 2011/0038415 A1* | 2/2011 | Min | H04N 19/50 |
| | | | 375/240.12 |
| 2011/0293001 A1* | 12/2011 | Lim | H04N 19/182 |
| | | | 375/240.12 |
| 2012/0183074 A1 | 7/2012 | Fuldseth | |
| 2012/0263225 A1 | 10/2012 | Lee | |
| 2014/0092969 A1* | 4/2014 | Lee | H04N 19/433 |
| | | | 375/240.15 |
| 2015/0215631 A1 | 7/2015 | Zhou et al. | |
| 2016/0227214 A1 | 8/2016 | Rapaka et al. | |
| 2016/0345013 A1 | 11/2016 | Ishida et al. | |
| 2017/0013268 A1 | 1/2017 | Kim et al. | |

* cited by examiner

METHODS AND DEVICES FOR ENCODING A VIDEO STREAM USING A FIRST AND A SECOND ENCODER

CROSS-REFERENCE TO RELATED APPLICATION

The present application claims priority to EP 19163607.5, filed Mar. 19, 2019, the entire contents of which are incorporated herein by reference.

TECHNICAL FIELD

The present invention relates to the field of image encoding. In particular, it relates to methods and devices where the concept of auxiliary frames may be employed to reduce or remove the need of copying data, for reference encoding purposes, between encoders which encode different parts of an image frame.

BACKGROUND

In recent years the number of monitoring cameras, e.g., network camera monitoring systems, has increased. Similarly, the possible image resolution of an image captured by an image sensor of a monitoring camera has increased. This is advantageous from a monitoring perspective, since more details in the monitored scene may be captured. However, from an encoder perspective, this development has resulted in that an image captured by a high-resolution image sensor (or by a plurality of image sensors) may be too large for one encoder (encoder chip) to encode at an acceptable frame rate. Advantageously, the concept of tiles/slices in, e.g., H.265 encoding may be employed to produce a single encoded image from image data encoded by a plurality of encoders, such as two encoders. Consequently, image data of an image frame can be divided into at least a first and a second portion of image data, where the first portion is encoded by a first encoder, and the second portion is encoded by a second encoder, wherein the two encoders have separate buffer memories (reference buffers) for reference encoding.

A problem arises when motion vectors are to be found, as this means that theoretically, both encoders need to have access to the entire reference frame, requiring copying in both directions between the two encoders. In practice, motion vector search is not performed in the entire reference frame, though, but in a limited search window, in order for the search to be finished in a short enough time to maintain a desired frame rate. Therefore, it will not be necessary to copy the whole reference frame slice or tile from one encoder to the other, but only a sufficiently large portion to accommodate the search window.

However, copying image data from the first encoder to the second encoder, and vice versa, is cumbersome. It is also necessary to perform synchronisation to ensure that both encoders have completed a previous image frame before encoding of a new image frame starts.

There is thus a need for improvements within this context.

SUMMARY OF THE INVENTION

In view of the above, it is thus an object of the present invention to overcome or at least mitigate the problems discussed above. In particular, it is an object to provide encoding methods and encoders where the concept of auxiliary frames may be employed to reduce or remove the need of copying data, for reference encoding purposes, between encoders which encodes different parts of an image frame. The inventive concept described herein may be defined according to the following exemplary method.

There is provided a method for encoding a video stream in a video coding format, using a first and a second encoder, wherein the video coding format supports including an auxiliary frame in the encoded video stream, the auxiliary frame being referenced by another frame in the encoded video stream and comprising image data complementing said another frame, wherein the image data of the auxiliary frame is not intended to be shown when decoding the encoded video stream but instead used in conjunction with data of said another frame to achieve image data to be shown, the method comprising the steps of:
  receiving original image data captured by at least one image sensor;
  encoding image data of an auxiliary frame by:
    spatially modifying original image data;
    encoding the first portion of the modified image data using the first encoder;
    encoding the second portion of the modified image data using the second encoder;
  forming the auxiliary frame, where the image data of the auxiliary frame includes the first and second encoded portions of modified image data;
  determining motion vectors corresponding to a restoration of the auxiliary frame image data back to a spatial arrangement of the original image data, and
  encoding an inter frame referencing the auxiliary frame, wherein motion vectors of the first frame correspond to the determined motion vectors.

By an auxiliary frame is generally meant storage of image data which complements another frame (also known as a master image, or display frame) in the encoded video stream. The auxiliary frame can be used in various forms to assist in displaying the frame it complements (in this case the inter frame referencing the auxiliary frame) but is not typically displayed as such. The auxiliary frame may also be referred to as auxiliary image, auxiliary image item, non-displayed frame, auxiliary picture etc. Known applications of an auxiliary frame include using it for an alpha plane or a depth map.

The encoded inter frame (produced in the last step in the above exemplary method) may thus also be called master image or master frame.

Within for example the H.265 encoding standard (and other newer encoding standards such as Google's VP10), a frame can be tagged as "no-display", meaning that the frame is not to be displayed to the user at a decoder side. In H.265 for example, the tagging can be done by setting the pic_output_flag in the slice header to false or setting the no_display flag in the SEI header to true.

The inventors have realized that such auxiliary frames, in conjunction with the frames that references the auxiliary frames, can be used to reduce or remove the need of copying data between two (or more) encoders which encodes separate parts of the received original image data. By taking into account the limitations and functionality of the encoders, and how the encoding of the original image data is divided between the encoders, the original image data can be modified such that the needs of copying data between the encoders (for reference encoding purposes, i.e., to avoid/limit reading and copying from the reference buffer of the other encoder) can be reduced or completely removed.

By doing this, the bitrate may not be substantially increased because of the use of separate encoder with separate buffer memories, even if no/little copying of reference data is performed between the two encoders.

The motion vectors of the inter frame will, at the decoder side, be used for restoration of the auxiliary frame image data back to a spatial arrangement of the original image data, in a low complexity way by a standard video stream decoder that supports the video coding format used by the encoder.

The present embodiment is thus further advantageous in that the encoded video stream can be decoded by a standard video stream decoder that supports the video coding format used by the encoder since the above method follows the standard of such video coding format.

In the following, different embodiments implementing the above described inventive concept will be described.

In some systems, the need of copying data, for reference encoding purposes, between encoders which encode different parts of an image frame may be removed by restricting the search window for motion vector search for the encoders, such that the encoders are restricted to not search for motion vectors in reference frames produced by the other encoder. However, this may not always be desirable or even possible, due to limitations in the encoders. Instead, the concept of auxiliary frames may be employed according to the below.

According to a first aspect of the inventive concept, the above object is achieved by a method for encoding a video stream in a video coding format, using a first encoder and a second encoder which operate independently of each other, each encoder having a motion vector search range for block matching, wherein the video coding format supports including an auxiliary frame in the encoded video stream, the auxiliary frame being referenced by another frame in the encoded video stream and comprising image data complementing said another frame, wherein the image data of the auxiliary frame is not intended to be shown when decoding the encoded video stream but instead used in conjunction with data of said another frame to achieve image data to be shown.

The method comprises the steps of:
receiving original image data captured by at least one image sensor;
forming an auxiliary frame by modifying and encoding the original image data, wherein the auxiliary frame is formed by:
  spatially splitting the original image data by a division line, thereby forming a first image data portion of a first spatial region of the original image data and a second image data portion of a second spatial region of the original image data;
  encoding, by the first encoder, the first image data portion, wherein motion vector search in the first encoder is allowed to extend across the division line into a first virtual pixel region;
  encoding, by the second encoder, the second image data portion, wherein motion vector search in the second encoder is allowed to extend across the division line into a second virtual pixel region;
  providing an encoded buffer region of pixels, the buffer region having a size equal to at least a size of a largest of the first and second virtual pixel regions;
  wherein the first virtual pixel region, the second virtual pixel region and the buffer region comprise pixels with corresponding pixel values; and
  spatially joining the encoded first image data portion, the encoded second image data portion, and the encoded buffer region such that the encoded buffer region is sandwiched between the first and second image data portions.

The method further comprises determining motion vectors corresponding to a restoration of the auxiliary frame image data back to a spatial arrangement of the original image data, and encoding an inter frame referencing the auxiliary frame, wherein motion vectors of the inter frame correspond to the determined motion vectors.

In this disclosure, the term "a first and second encoder which operate independently of each other" generally means that no transfer of data is done between the first and second encoder for reference encoding purposes (inter frame encoding).

In this disclosure, the term "corresponding pixel values" means that the pixel values of the first virtual pixel region, the second virtual pixel region and the buffer region are similar in composition. For example, the first virtual pixel region, the second virtual pixel region and the buffer region may comprise pixels with the same pixel value, e.g. black, green etc., Advantageously, this represent a low complexity embodiment. In other embodiments, the pixel values of the first virtual pixel region, the second virtual pixel region and the buffer region all includes similar or the same pixel value pattern, for example half black, half white, or transitioning from green to blue etc,.

An advantage of using first and second encoders which operate independently of each other is that the synchronization requirement between the two encoders is reduced or removed. Since no data is required to be copied between the first and second encoder, the encoders can encode their respective portions of image data for a plurality of image frames without having to wait for the other encoder to complete encoding of, e.g., data to be used for inter encoding purposes.

In this embodiment, the separate encoders each creates a virtual pixel region (first and second) and uses this for reference encoding when running the motion vector search for blocks of pixels (macroblocks, coding units [CU], coding tree units [CTU]) near the division line, instead of requiring copying of image data from the other encoder. This virtual pixel region is never included in the encoded image data output from the encoder, but instead used only for motion vector search.

To be able to decode the encoded image data, a buffer region of pixels needs to be included in the encoded image data, sandwiched between the first and second image data portions. One of the encoders (or a separate processing unit) may be responsible for spatially joining (putting together) the image data of the auxiliary frames, for example such that the image data of the auxiliary frame comprises the encoded first image data portion as a first tile or a first slice, the encoded buffer region as a second tile or a second slice, and the encoded second image data portion as a third tile or a third slice. Other suitable ways of spatially joining the encoded first image data portion, the encoded second image data portion, and the encoded buffer region in the image data of the auxiliary frame are equally applicable.

By setting the size of the encoded buffer region of pixels to at least a size of a largest of the first and second virtual pixel regions, problems are avoided when decoding the auxiliary image.

To remove the buffer region at the decoder side, motion vectors corresponding to a restoration of the auxiliary frame image data back to a spatial arrangement of the original image data are determined and used as motion vectors of the inter frame referencing the auxiliary frame.

A resulting encoded video stream thus includes no-display/auxiliary frames with added boundary zones between the image data portions (frame segments) that are sent to different encoders, and display frames referring to the no-display/auxiliary frames, and that only include motion vectors for restoring the auxiliary frame image data back to a spatial arrangement of the original image data at a decoder side.

According to some embodiments, the division line is spatially splitting the original image data in a vertical direction, and wherein the step of determining motion vectors comprises:

setting motion vectors corresponding to the original image data in the first image data portion to zero;

setting a vertical component of motion vectors corresponding to the original image data in the second image data portion to zero; and setting a horizontal component of motion vectors corresponding to the original image data in the second image data portion to the width of the buffer region.

Also motion vectors corresponding to the encoded buffer region are set to (w, 0) in this case, where w represents the width of the buffer region. The motion vectors of the inter frame referencing the auxiliary frame are thus set according to the above.

Consequently, due to the motion vectors of the inter frame referencing the auxiliary frame, the second image data portion will, when decoded, be moved in a horizontal direction to be placed directly adjacent to the first image data portion. Advantageously, this embodiment provides a low complexity calculation of the motion vectors for restoration of the auxiliary frame image data back to a spatial arrangement of the original image data. It should be noted that the calculation of motion vectors may be performed once, and then reused for all display frames, since the modification of the received original image data may be done in a same way for all image frames (e.g., in a video stream) captured by the at least one image sensor.

According to some embodiments, the division line is spatially splitting the original image data in a horizontal direction, wherein the step of determining motion vectors comprises:

setting motion vectors corresponding to the original image data in the first image data portion to zero;

setting a horizontal component of motion vectors corresponding to the original image data in the second image data portion to zero; and setting a vertical component of motion vectors corresponding to the original image data in the second image data portion to the height of the buffer region.

Also motion vectors corresponding to the encoded buffer region are set to (0, h) in this case, where h represents the height of the buffer region. The motion vectors of the inter frame referencing the auxiliary frame are thus set according to the above.

Consequently, due to the motion vectors of the inter frame referencing the auxiliary frame, the second image data portion will, when decoded, be moved in a vertical direction to be placed directly adjacent to the first image data portion. Advantageously, this embodiment provides a low complexity calculation of the motion vectors for restoration of the auxiliary frame image data back to a spatial arrangement of the original image data. Similar to above, the calculation of motion vectors in this embodiment may be performed once, and then reused for all display frames, since the modification of the received original image data may be done in a same way for all image frames (e.g., in a video stream) captured by the at least one image sensor.

According to some embodiments, the method further comprises including in a header of the inter frame a display size of the resulting decoded image frame, wherein the display size equals a size of the original image data. Consequently, in case the motion vectors are displacing the buffer region to for example the bottom of the decoded image frame, the display size in the header of the inter frame (display frame) can be used for cropping the decoded image frame such that the buffer region is not displayed.

According to some embodiments, the corresponding value(s) of the pixels of the first virtual pixel region, the second virtual pixel region and the buffer region is determined by analysing the original image data. For example, a color to be used for all pixels in the regions may be determined, or a suitable transition between colors to be used for the pixels in the regions may be determined. This embodiment increases the chance that the blocks of pixels near the division line can benefit from motion search into the virtual pixel regions (more likely to find a suitable matching block of pixels in the virtual pixel regions), which in turn may decrease the bit rate of the encoded bit stream.

According to some embodiments, the corresponding value(s) of the pixels of the first virtual pixel region, the second virtual pixel region and the buffer region is predefined. For example, a black colour, or green colour or any other suitable colour (pixel value) may be used. This embodiment reduces the complexity of the encoding method.

According to some embodiments, the size of the first virtual pixel region depends on a size of a motion search window of the first encoder, and the size of the second virtual pixel region depends on a size of a motion search window of the second encoder. Consequently, a more flexible encoding method is achieved, allowing for separate motion search windows for the encoders (e.g., set based on the computational power of the encoders or similar) while still only defining a large enough respective virtual pixel zone.

According to some embodiments, the buffer region has the size equal to the largest of the first and second virtual pixel regions, which gives the buffer region the height (or width depending on the direction of the division line) that corresponds to the largest motion vector search range of the encoders. Consequently, bit rate may be saved.

According to some embodiments, the video coding format is one of the list of: Advanced Video Coding, High Efficiency Video Coding, H.265, H.266, VP9, VP10, and AV1.

According to a second aspect of the invention, the above object is achieved by a computer program product comprising a computer-readable medium with computer code instructions adapted to carry out the method of the first aspect when executed by a device having processing capability.

According to a third aspect of the invention, the above object is achieved by a device for encoding a video stream in a video coding format, the device comprising a first encoder and a second encoder which operate independently of each other, each encoder having a motion vector search range for block matching, wherein the video coding format supports including an auxiliary frame in the encoded video stream, the auxiliary frame being referenced by another frame in the encoded video stream and comprising image data complementing said another frame, wherein the image data of the auxiliary frame is not intended to be shown when decoding the encoded video stream but instead used in conjunction with data of said another frame to achieve image data to be shown, the device comprising circuitry configured to:

receive original image data captured by at least one image sensor;

form an auxiliary frame by modifying and encoding the original image data, wherein the auxiliary frame is formed by:

spatially splitting the original image data by a division line, thereby forming a first image data portion of a first spatial region of the original image data and a second image data portion of a second spatial region of the original image data;

encoding, by the first encoder, the first image data portion, wherein motion vector search in the first encoder is allowed to extend across the division line into a first virtual pixel region;

encoding, by the second encoder, the second image data portion, wherein motion vector search in the second encoder is allowed to extend across the division line into a second virtual pixel region;

providing an encoded buffer region of pixels, the buffer region having a size equal to at least the size of a largest of the first and second virtual pixel regions, wherein the first virtual pixel region, the second virtual pixel region and the buffer region comprise pixels with corresponding pixel values;

spatially joining the encoded first image data portion, the encoded second image data portion, and the encoded buffer region such that the encoded buffer region is sandwiched between the first and second image data portions;

determine motion vectors corresponding to a restoration of the auxiliary frame image data back to a spatial arrangement of the original image data, encode an inter frame referencing the auxiliary frame, wherein motion vectors of the inter frame correspond to the determined motion vectors.

The second and third aspects may generally have the same features and advantages as the first aspect.

There exist other configurations of the multi-chip encoder and the image data to be encoded where regular encoding of the image data may require much copying of data, for reference encoding purposes, between encoders.

Below follows a description of further embodiments implementing the above described inventive concept for achieving the above objects of reducing or removing the need of copying data, for reference encoding purposes, between encoders which encodes different parts of an image frame.

In some setups of image capturing systems, the original image data to be encoded is captured by a plurality of image sensors, where the image sensors a configured such that the image data of the plurality of image sensors is positioned next to each other in one direction in the original image data. In these setups, there may be a problem in case the two (or more) encoders to be used for encoding the original image data are limited to divide the incoming original image in the perpendicular direction to the configuration of the image sensors. In this case, much data to be copied between the two encoders for reference encoding may be expected if regular encoding is performed. However, also in this case, the concept of auxiliary frames may be employed to reduce the need of copying data according to the below.

According to a fourth aspect of the invention, the above object is achieved by a method for encoding a video stream in a video coding format, using a first and a second encoder, wherein the video coding format supports including an auxiliary frame in the encoded video stream, the auxiliary frame being referenced by another frame in the encoded video stream and comprising image data complementing said another frame, wherein the image data of the auxiliary frame is not intended to be shown when decoding the encoded video stream but instead used in conjunction with data of said another frame to achieve image data to be shown, the method comprising the steps of:

receiving original image data captured by at least a first image sensor and a second image sensor;

forming an auxiliary frame by modifying and encoding the original image data, wherein the auxiliary frame is formed by:

spatially rearranging the original image data into spatially rearranged image data, such that the rearranged image data can be spatially split by a division line, thereby forming a first image data portion of a first spatial region of the rearranged image data and second image data portion of a second spatial region of the rearranged image data, wherein the first image data portion comprises the image data of the original image data captured by the first image sensor, and wherein the second portion comprises the image data of the original image data captured by the second image sensor;

spatially splitting the rearranged image data by the division line to form the first image data portion and the second image data portion;

encoding, by the first encoder, the first image data portion;

encoding, by the second encoder, the second image data portion;

spatially joining the encoded first image data portion and the encoded second image data portion at the division line;

The method further comprises determining motion vectors corresponding to a restoration of the auxiliary frame image data back to a spatial arrangement of the original image data, and encoding an inter frame referencing the auxiliary frame, wherein motion vectors of the first frame correspond to the determined motion vectors.

In this embodiment, the idea is to spatially re-arrange the image data before being segmented by the encoder system and sent to different encoders. The re-arrangement organizes the image data so that data from the same sensor is positioned in the same encoder segment.

A first frame is thus encoded with re-arranged image data. This first frame is set to be a no-display (a.k.a. auxiliary) frame. The following frame is a display frame (i.e., not set to no-display/auxiliary) and this following frame contains only motion vectors. The display frame references to the nodisplay/auxiliary frame. The motion vectors are chosen to as to arrange the image data back to its original structure.

By spatially rearranging the original image data before splitting the image data in parts to be handled by separate encoder, advantageously it may be ensured that all image data from a particular image sensor are handled by a single encoder, which in turn reduces the need of copying data between the encoders for encoding purposes. This is in particular advantageous in case the image sensor capturing the image data and the encoder encoding the image data captured by the image sensor are implemented in a same chip in a video capturing device.

To restore the image data back to the spatial arrangement of the original image data at the decoder side, motion vectors corresponding to a restoration of the auxiliary frame image data back to a spatial arrangement of the original image data are determined and used as motion vectors of the inter frame referencing the auxiliary frame.

A resulting encoded video stream thus includes no-display/auxiliary frames with spatially rearranged image data encoded by the first and second encoder and display frames referring to the no-display/auxiliary frames, and that only include motion vectors for restoring the auxiliary frame image data back to a spatial arrangement of the original image data at a decoder side.

According to some embodiments, the first and second encoder operate independently of each other. An advantage of using first and second encoders which operate independently of each other is that the synchronization requirement between the two encoders is reduced or removed. Since no data is copied between the first and second encoder, the encoders can encode their respective portions of image data for a plurality of image frames without having to wait for the other encoder to complete encoding of, e.g., data to be used for inter encoding purposes.

According to some embodiments, image data of the auxiliary frame comprise the encoded first image data portion as a first slice or tile, and the encoded second image data portion as a second slice or tile. One of the encoders (or a separate processing unit) may be responsible for spatially joining (putting together/assembling) the image data of the auxiliary frames.

According to some embodiments, the first and second encoders support encoding in slices and not encoding in tiles, wherein the division line is spatially splitting the rearranged image data in a horizontal direction. In this embodiment, even if the original image data is organized in tiles (e.g., a first tile of the received image data is captured by a first image sensor, and a second tile of the received image data is captured by a second image sensor), the spatial rearrangement of the image data will result in less or no motion vectors moving across the division line, thus reducing or even removing the need of copying data between the encoders for prediction encoding.

According to some embodiments, the step of spatially rearranging the original image data into spatially rearranged image data comprises: switching data corresponding to spatial positions of a lower left quadrant of the original image data and an upper right quadrant of the original image data.

Advantageously, a low complexity way of spatially rearranging the original image data is achieved, which also will result in that the step of determining the motion vectors for restoration of the auxiliary frame image data back to a spatial arrangement of the original image data is simplified.

According to some embodiments, the video coding format is one of the list of: Advanced Video Coding, High Efficiency Video Coding, H.265, H.266, VP9, VP10, and AV1.

According to a fifth aspect of the invention, the above object is achieved by a computer program product comprising a computer-readable medium with computer code instructions adapted to carry out the method of the fourth aspect when executed by a device having processing capability.

According to a sixth aspect of the invention, the above object is achieved by a device for encoding a video stream in a video coding format, the device comprising a first and a second encoder, wherein the video coding format supports including an auxiliary frame in the encoded video stream, the auxiliary frame being referenced by another frame in the encoded video stream and comprising image data complementing said another frame, wherein the image data of the auxiliary frame is not intended to be shown when decoding the encoded video stream but instead used in conjunction with data of said another frame to achieve image data to be shown, the device comprising circuitry configured to:

receive original image data captured by at least a first image sensor and a second image sensor;

form an auxiliary frame by modifying and encoding the original image data, wherein the auxiliary frame is formed by:

spatially rearranging the original image data into spatially rearranged image data, such that the rearranged image data can be spatially split by a division line, thereby forming a first image data portion of a first spatial region of the rearranged image data and second image data portion of a second spatial region of the rearranged image data, wherein the first image data portion comprises the image data of the original image data captured by the first image sensor, and wherein the second portion comprises the image data of the original image data captured by the second image sensor;

spatially splitting the rearranged image data by the division line to form the first image data portion and the second image data portion;

encoding, by the first encoder, the first image data portion;

encoding, by the second encoder, the second image data portion;

spatially joining the encoded first image data portion and the encoded second image data portion at the division line;

determine motion vectors corresponding to a restoration of the auxiliary frame image data back to a spatial arrangement of the original image data, encode an inter frame referencing the auxiliary frame, wherein motion vectors of the first frame correspond to the determined motion vectors.

The fifth and sixth aspects may generally have the same features and advantages as the fourth aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements wherein.

DETAILED DESCRIPTION OF EMBODIMENTS

The present invention will now be described more fully hereinafter with reference to the accompanying drawings, in which embodiments of the invention are shown. The systems and devices disclosed herein will be described during operation.

In newer encoding methods, e.g., Advanced Video Coding (AVC) (also called H.264) and High Efficiency Video Coding (HEVC) (also called H.265), the concept of tiles (only supported by HEVC encoding) and slices has been introduced. Tiles and slices allow for the image to be divided into a grid of rectangular (or substantially rectangular) regions that can be decoded/encoded in parallel. In other words, this concept may be used for parallel processing purposes, to let separate encoders or cores of an encoder encode an image frame in parallel. In this disclosure, separate encoders (a first and second encoder), each having a separate buffer memory for reference encoding (inter encoding, P-frame encoding, B-frame encoding), are employed, using the concept of tiles/slices to encode an image frame. In this setup, a problem arises when motion vectors are to be found, as this means that theoretically, both encoders need to have access to the entire reference frame, or at least the part needed according to the size of the search window. The present disclosure is aimed at encoding methods which facilitate encoding using the above described setup, and where the need for copying data from between the encoders for inter encoding purposes is removed or at least reduced, but where the encoding methods still achieve encoding of image frames without substantial penalty when it comes to bit rate or at least decreased quality of the encoded image frames. In particular, the present invention aims at providing new ways of encoding image data in the above described multi-chip encoder setup which comprises a plurality of separate encoders, for a video coding format that supports including an auxiliary frame in the encoded video stream. Examples of such video coding formats include Advanced Video Coding, High Efficiency Video Coding, H.265, H.266, VP9, VP10, and AV1.

Figure 1:
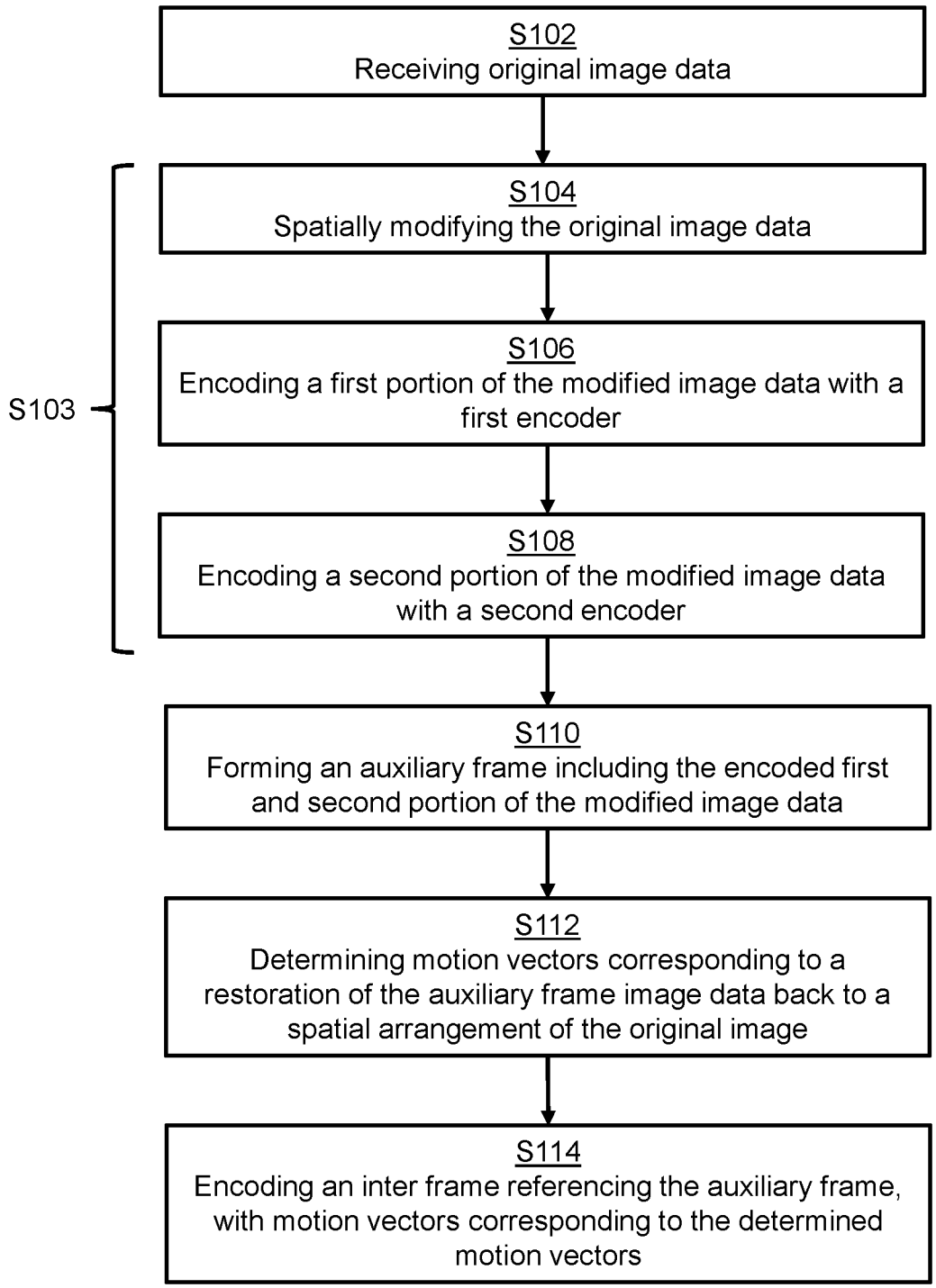
FIG. 1 shows a flow chart of the inventive concept described herein.

FIG. 1 shows a generalized summary of the different embodiments for achieving the above. FIGS. 2-6, 8-11 show application for the inventive concept of FIG. 1 according to embodiments. FIG. 1 thus illustrates the common features of the different embodiments of FIGS. 2-6, 8-11, which all relate to methods and devices for encoding a video stream in a video coding format, using a first and a second encoder, wherein the video coding format supports including an auxiliary frame in the encoded video stream, the auxiliary frame being referenced by another frame in the encoded video stream and comprising image data complementing said another frame, wherein the image data of the auxiliary frame is not intended to be shown when decoding the encoded video stream but instead used in conjunction with data of said another frame to achieve image data to be shown. The common features include: receiving, S102, original image data captured by at least one image sensor. The original data may be the raw image data (e.g., raw output of Bayer-filter cameras) as captured by the sensor, where the raw image data often is interpolated such that a set of complete red, green, and blue values is defined for each pixel. For other sensors, other forms of the original image data may be received.

The original image data then form the basis for image data of an auxiliary frame. The image data of the auxiliary frame is defined S103 by spatially modifying S104 the original image data;

encoding S106 a first portion of the modified image data using the first encoder;

encoding S108 a second portion of the modified image data using the second encoder;

Then encoded first and second portions of the modified image data are included in the image data of the auxiliary frame which thereby is formed S110.

The modification S104 of the original image data has changed the spatial arrangement of the original image data. However, a viewer of the later decoded image data is typically interested in seeing the decoded image stream having the spatial arrangement of the original image data. For that reason, the encoding method comprises determining (S112) motion vectors corresponding to a restoration of the auxiliary frame image data back to a spatial arrangement of the original image data, and encoding (S114) an inter frame referencing the auxiliary frame, wherein motion vectors of the first frame correspond to the determined motion vectors.

When the inter frame is decoded, the motion vectors of the inter frame will thus cause the decoder to rearrange modified image data of the auxiliary frame (which the inter frame refers to) such that the decoded image frame will show image data having the spatial arrangement of the image data as originally captured.

Figure 2:
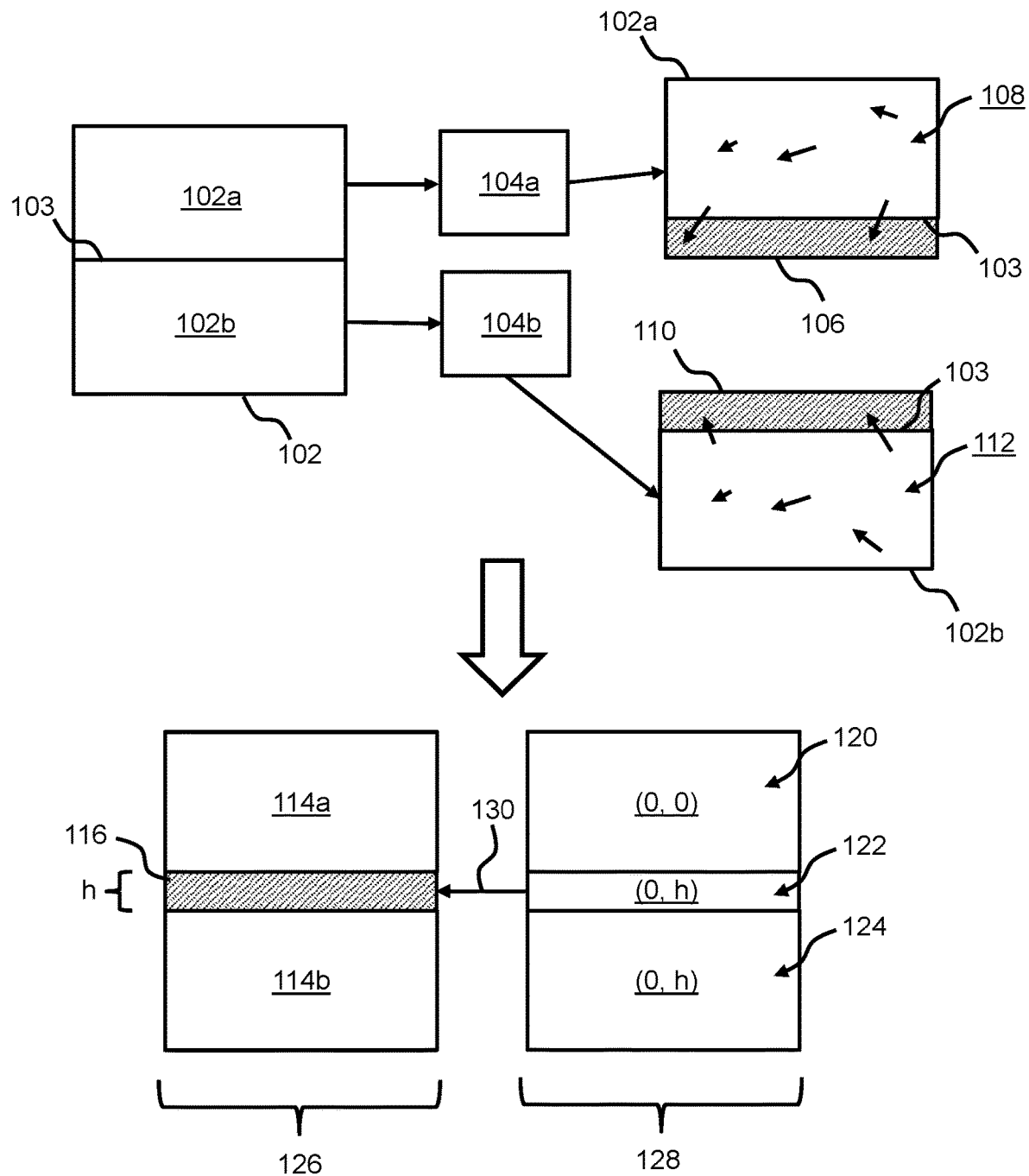
FIG. 2 shows a method for encoding a video stream in a video coding format supporting auxiliary frames, according to a first embodiment.

FIG. 2 schematically shows a first embodiment of the encoding method of FIG. 1. This embodiment will now be described in conjunction with FIG. 6.

The original image data 102, captured by at least one image sensor, is received. In this embodiment, the modifying and encoding of the original image data (S104-S108 commonly referred to as S103 in FIG. 1), comprise spatially splitting S602 the original image data 102 by a division line 103, thereby forming a first image data portion 102*a* of a first spatial region of the original image data 102 and a second image data portion 102*b* of a second spatial region of the original image data 102. In FIG. 2, the division line 103 is splitting the image data 102 in half, but in other embodiments, the division line may split the image data 102 in parts with different sizes. Advantageously, the available processing power of the encoders 104 which will be encoding the parts 102*a*, 102*b* may be used for determining the location of the division line 103.

The first image data portion 102*a* is thus encoded S604 by a first encoder 104*a*, and the second image data portion 102*b* is thus encoded S606 by a second encoder 104*b*.

To achieve the purpose of the inventive concept, in this embodiment to completely remove the need of copying data between the encoders (for reference encoding purposes, i.e., to avoid reading and copying from the reference buffer of the other encoder), the motion vector search when encoding of the first image data portion 102*a* is allowed to extend across the division line 103 into a first virtual pixel region 106.

The first virtual pixel region 106 comprises (virtual) pixels which all defines a single color. When motion vector search for a macro block of pixels near the division line 103 is performed, the motion vector search will compare that macro block with a block of pixels (of an earlier encoded image frame) in a region surrounding the position of the macroblock to to find a suitable match that can be referenced to with a sufficiently low cost. The costs for intra and inter encoding, respectively, may be preset (and can be configured) in the encoder. Since the motion vector search is allowed to extend across the division line 103 into the first virtual pixel region 106, there is no need of reading and copying from the reference buffer of the other encoder 104b. This concept is schematically shown in FIG. 2 as arrows 108.

Similarly, for the second encoder 104b, motion vector search in the second encoder 104b is allowed to extend across the division line 103 into a second virtual pixel region 110. This concept is schematically shown in FIG. 2 as arrows 112.

The first and second virtual pixel region may be pre-stored in the encoders, or may be defined for each image data to be encoded.

In FIG. 2, the sizes of the virtual pixel regions 106, 110 are equal. The sizes may in another embodiment differ. According to some embodiments, the size of the first virtual pixel region 106 depends on a size of a motion search window of the first encoder 104a, and the size of the second virtual pixel region 110 depends on a size of a motion search window of the second encoder 104b. For example, if the motion vector search window of the first encoder 104a has a vertical component of 64 pixels, the height of the first virtual pixel region 106 may be set to 64, and the width equal to the width of the original image data 102. Similarly, if the motion vector search window of the second encoder 104a has a vertical component of 32 pixels, the height of the second virtual pixel region 106 may be set to 32, and the width equal to the width of the original image data 102. Any other suitable sizes are applicable. It should be noted that the search window of the encoders may be changed during encoding of a video stream, for example between encoded group of pictures (GOP). For example, if the processing power of one of the encoders for some reason is limited for a specific GOP, the size of the search window for that encoder may be reduced. In this case, the size of the corresponding virtual pixel region may be adjusted accordingly. The same applies mutatis mutandis if the size of a search window for an encoder is increased.

To be able to decode the encoded images, in the case that the motion vector search results in motion vectors for a block of pixels in the first 102a or second 102b image data region extends across the division line 103 into the first 106 or second virtual pixel region 110, an encoded buffer region of pixels 116 is provided. The encoded buffer region 116 is sandwiched between the encoded first 114a and second 114b image data portions, such that the encoded first image data portion 114a, encoded second image data portion 114b, and the encoded buffer region 116 are spatially joined S608 to form the image data of an auxiliary frame 126. In this embodiment, the image data of the auxiliary frame comprises the encoded first image data portion 114a as a first slice, the encoded second image data portion 114b as a second slice, and the encoded buffer region 116 as third slice sandwiched between the first and second slices.

The buffer region 116 may be encoded (by either one of the first 104a and second 104b encoder) for each received original image data 102. In other embodiments, the buffer region 116 is encoded once, and then stored to be used for several received original image data. The encoded buffer region 116 may also be pre-stored in the multi-chip encoder.

The spatially joining S608 of the encoded first image data portion 114a, encoded second image data portion 114b, and the encoded buffer region 116 may be performed by a stream multiplexer (not shown in FIG. 2), which for each image frame, receives the encoded first image data portion 114a, the encoded second image data portion 114b, and the encoded buffer region 116 and forms a joined encoded image data to be used as the image data of the auxiliary frame 126. The stream multiplexer may in some embodiments be unit separate from the encoders 104a-b, and in other embodiments implemented in one of the first 104a and second 104b encoders.

The size of the encoded buffer region 116 equals to at least a size of a largest of the first 103 and second virtual pixel regions 110. For example, the buffer region may have the size equal to the largest of the first 106 and second 110 virtual pixel regions. In the example above, where the height of the first virtual pixel region 106 is 64 and the height of the second virtual pixel region 110 is 32, the height h of the encoded buffer region 116 is set to 64 (and the width equal to the width of the original image data 102).

The pixel values of the first virtual pixel region 106, the second virtual pixel region 110 and the buffer region 116 are similar in composition, for example defining a similar pixel value pattern. In some embodiments, the first virtual pixel region 106, the second virtual pixel region 110 and the buffer region 116 may comprise pixels with the same pixel value. For example, the value of the pixels of the first virtual pixel region, the second virtual pixel region and the buffer region may be predefined such as defining the colour black or green. According to other embodiments, the value of the pixels of the first virtual pixel region 106, the second virtual pixel region 110 and the buffer region 102 is determined by analysing the original image data. Such analysis may for example be made once per Group of Pictures (GOP) and then be used for the entire GOP. In another example, such analysis may for example be made when the camera capturing the images changes field of view, and then be used until the next change of field of view.

To be able to restore the decoded image data back to the spatial arrangement of the original image data (i.e., removing the buffer region and directly join the (decoded) first and second image data portion again), motion vectors 120, 122, 124 corresponding to a restoration of the auxiliary frame image data back to a spatial arrangement of the original image data are determined. An inter frame 128 referencing 130 the auxiliary frame 126 is encoded, comprising the determined motion vectors 120, 122, 124. For simplicity, in FIG. 2, the motion vectors 120, 122, 124 are represented by constant motion vector regions, meaning that all motion vectors within a region are intended to be the same, In other words, all motion vectors 120 within the uppermost region in an inter frame 128 have the same value, which in this example is (0,0). Typically, each separate block of pixels (CU, CTU, Macroblock) of the image data of the auxiliary frame have a corresponding motion vector in the inter frame 128.

In other words, the inter frame 128 referencing 130 the auxiliary frame 126 is encoded, where the determined motion vectors 120, 122, 124 are used as motion vectors of the inter encoded frame (which comprises no image data). As described above, the auxiliary frame 126 will not be directly decoded on a decoder side. Instead the image data 114a, 116, 114b of the auxiliary frame 126 will be used in conjunction with data of the inter encoded frame 128 (the motion vectors 120, 122, 124) to achieve image data to be shown.

In the embodiment of FIG. 2, wherein the division line 103 is spatially splitting the original image data in a horizontal direction, the step of determining S112 motion vectors 120, 122, 124 is done as following:

The motion vectors 120 corresponding to the original image data in the first image data portion are set to zero. A horizontal component of motion vectors 124 corresponding to the original image data in the second image data portion to is set to zero. The vertical component of motion vectors 124 corresponding to the original image data in the second image data portion to the height h of the buffer region. The motion vectors 122 corresponding to the buffer region are also set to (0, h). Setting the motion vectors as described above results in that the spatial arrangement of the original image data will be restored at the decoder side, where the second image data portion 114b will, when decoded, be moved in a vertical direction to be placed directly adjacent to the first image data portion 114a due to the motion vectors 122, 124.

In some embodiments, a header of the inter frame 128 comprises a display size of a resulting decoded image frame, wherein the display size equals a size of the original image data 102. Advantageously, this allows the decoder in a low complexity way to know what part of the decoded image frame that is intended to be shown. In the example of FIG. 2, if the entire decoded image frame is shown, a black (or other color) area with the height of the encoded buffer region 116 will be shown at the bottom of the decoded image, beneath the directly joined decoded first and second image data portion. By letting the decoder know, e.g. through the header of the inter frame 128, the intended display size of the decoded image frame, this black portion is not included in the decoded image frame. In other embodiments, the decoder is informed in other ways of the display size, such as the display size is being pre-defined in the decoder.

In the embodiment of the decoded image frame having a 1080p resolution, a height of 8 pixels of the encoded buffer region may be advantageous, since at this resolution, the 1080p-header already defines that an area of 8 pixels should be omitted in the decoded image frame. Consequently, the decoder may not decode a black area corresponding to the encoded buffer region at the bottom of the decoded image frame without the encoder necessarily having to make an adjustment to the standard header, or define a custom header.

Figure 3:
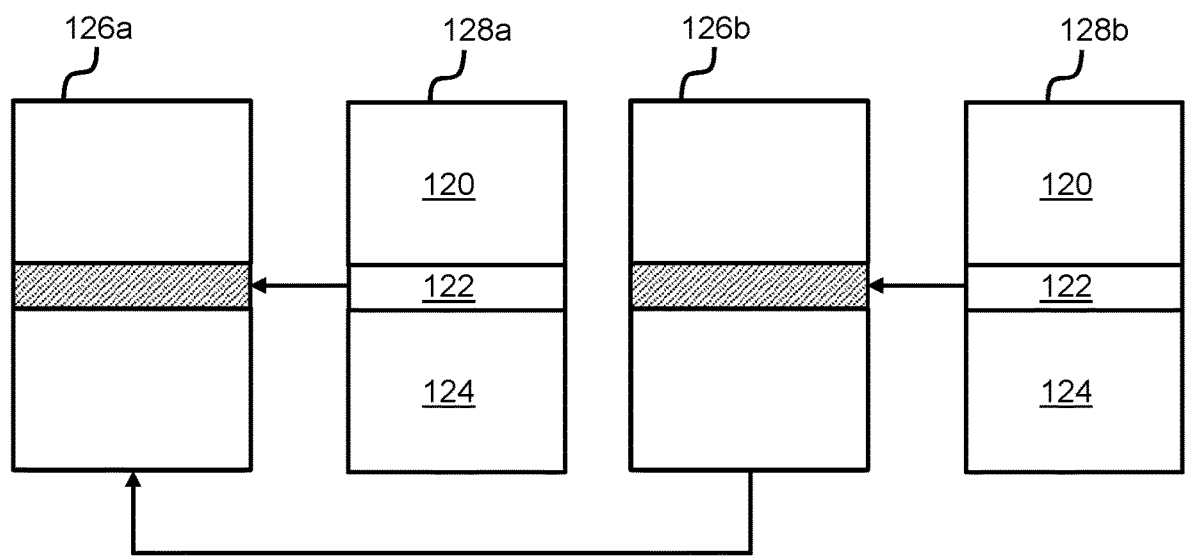
FIG. 3 shows an encoded video stream with a plurality of display frames and auxiliary frames encoded as shown in FIG. 2, FIGS. 4 and 5 show different ways of inserting a buffer region between image data portions according to embodiments.

FIG. 3 schematically shows an encoded video stream with a plurality of (inter encoded) display frames 128a, 128b and auxiliary frames 126a, 126b. The determined motion vectors 120, 122, 124 may be reused for all display frames 128a, 128b in such stream. The second auxiliary frame 126b is encoded as an inter encoded frame as described above in conjunction with FIG. 2, referencing the first auxiliary frame 126a. The first auxiliary frame 126a may be inter encoded or intra encoded. In any event, the first auxiliary frame (similar to the second auxiliary frame 126b) comprises an encoded buffer region (hatched with '///' in FIG. 3), to allow for encoding of the image data of the second auxiliary frame 126b using virtual pixel regions as described above.

Figures 4, 5:
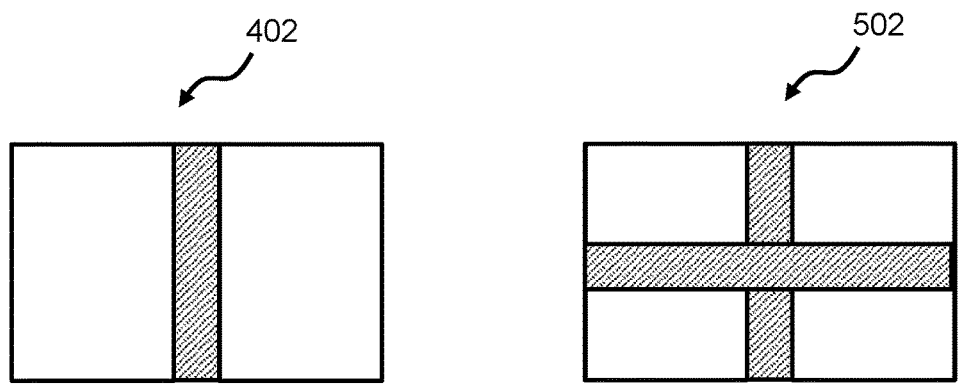
Figure 6:
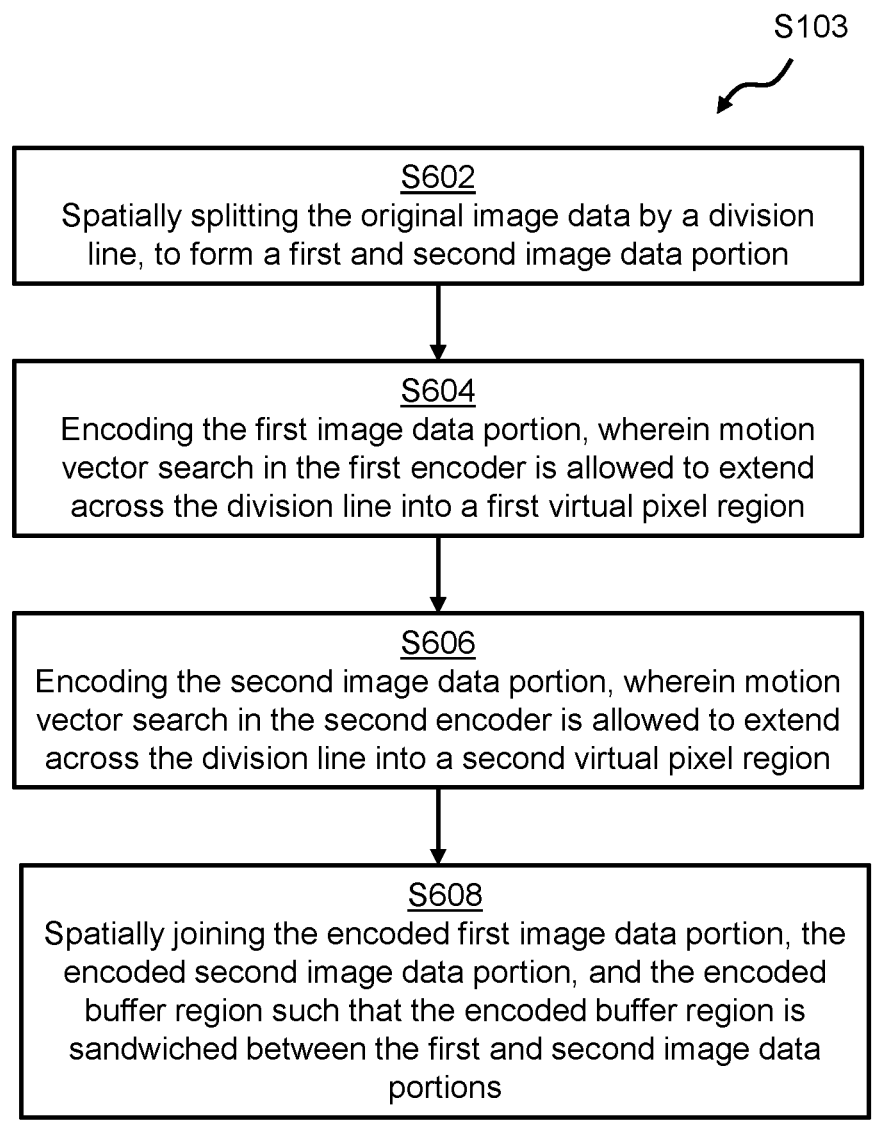
FIG. 6 shows an extension of the flow chart of FIG. 1, describing an embodiment of the inventive concept.

FIG. 4 schematically shows image data of an auxiliary frame 402 that comprises an encoded first image data portion as a first tile, and an encoded second image data portion as a second tile, and an encoded buffer region (hatched with '///') as a third tile sandwiched between the first and second image data portions. In this case, where the division line is spatially splitting the original image data in a vertical direction, the step of determining motion vectors comprises: setting motion vectors corresponding to the original image data in the first image data portion to zero, setting a vertical component of motion vectors corresponding to the original image data in the second image data portion to zero, and setting a horizontal component of motion vectors corresponding to the original image data in the second image data portion to the width of the buffer region.

FIG. 5 schematically shows image data of an auxiliary frame 502 in an embodiment where more than two separate encoders which operate independently of each other are used for encoding. In the case of FIG. 5, four independent encoders are used. The above description for how to achieve image data of an auxiliary frame and for how to determine motion vectors to restore of the auxiliary frame image data back to a spatial arrangement of the original image data, applies to this embodiment mutatis mutandis.

The encoding methods shown in FIG. 2-6 may be implemented in an encoding device comprising circuitry configured to perform the encoding methods. In one example, the methods above are carried out using a computer program product comprising a (non-transitory) computer-readable storage medium with instructions adapted to carry out the methods when executed by a device having processing capability.

Figure 7:
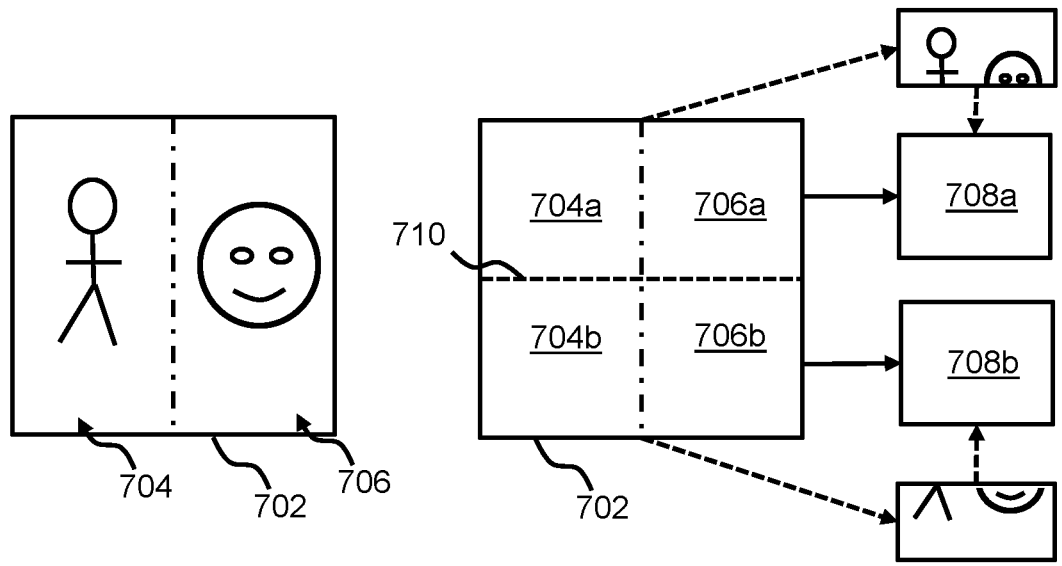
FIG. 7 shows a typical way of dividing original image data captured by a plurality of image sensors, and sending the resulting parts of original image data to different encoders.

FIG. 7 shows a typical way of dividing original image data captured by a plurality of image sensors, and sending each the resulting parts of original image data to different encoders. As illustrated in FIG. 7, the original image data 702 is captured by a first image sensor and a second image sensor. In this example, the first image sensor captures image data 704 representing a zoomed out view of a person, while the second image sensor captures image data 706 representing a zoomed in view of the head of the person. The original image data is thus arranged "tile-wise" next to each other in a horizontal direction. In case such data is to be encoded by a multi-chip encoder comprising (at least) two encoders 708a, 708b, which are limited to split the incoming original image with a division line 710 having a perpendicular direction to the configuration of the image sensors, in this case in slices, the result may be that much data need to be copied between the two encoders 708a, 708b for reference encoding. This is schematically shown in FIG. 7 where motion in image data 704 captured by the first image sensor may result in that image content are moved between an upper part 704a (encoded by the first encoder 708a) and a lower part 704b (encoded by the second encoder 708b) of the image data 704. Consequently, to avoid substantial penalty when it comes to bit rate or decreased quality of the encoded image frames, data need to be copied between the first 708a and second 708b encoders for reference encoding. The same applies for the image data 706 captured by the second image sensor which may result in that image content is moved between an upper part 706a (encoded by the first encoder 708a) and a lower part 706b (encoded by the second encoder 708b) of the image data 706.

However, also in this case, the concept of auxiliary frames may be employed to reduce the need of copying data according to the below.

Figure 8:
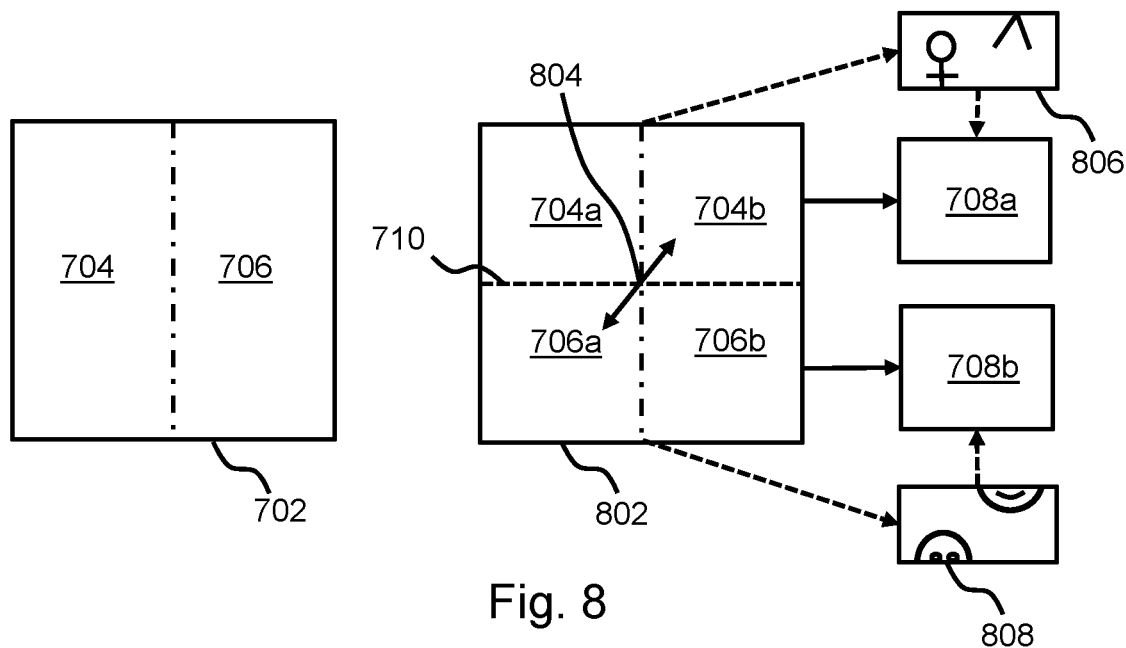
FIG. 8 shows an embodiment of spatially rearranging the original image data of FIG. 7 into spatially rearranged image data, prior to dividing the rearranged image data and sending the resulting parts of rearranged image data to different encoders.
Figure 9:
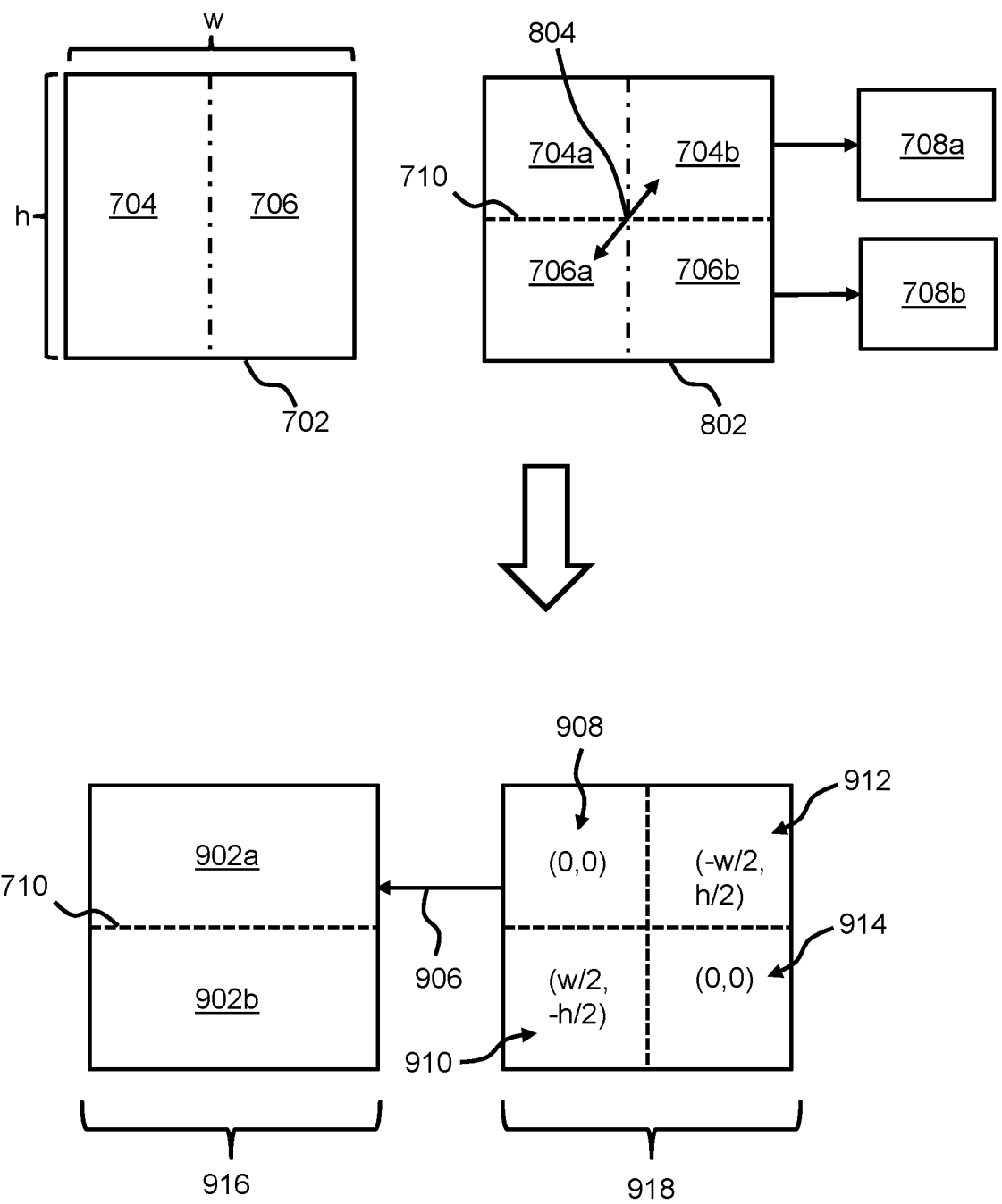
FIG. 9 shows a method for encoding a video stream in a video coding format supporting auxiliary frames, including the embodiment of FIG. 8.

FIGS. 8-9 schematically show a second embodiment of the encoding method of FIG. 1. This embodiment will now be described in conjunction with FIG. 11.

Similar to FIG. 7, in FIG. 8, original image data 702 captured by the first and second image sensor are received at the multi-chip encoder.

In this embodiment, the modifying and encoding of the original image data (S104-S108 commonly referred to as S103 in FIG. 1), comprises spatially rearranging S1102 the original image data 702 into spatially rearranged image data 802. The rearranging S1102 is done such that the rearranged image data 802 can be spatially split by a division line 710, thereby forming a first image data portion 704a, 704b of a first spatial region 806 of the rearranged image data 802 and second image data portion 706a, 706b of a second spatial region 808 of the rearranged image data 802. Consequently, as illustrated in FIG. 8, the first image data portion 704a, 704b comprises the image data 704 of the original image data captured by the first image sensor, and the second portion 706a, 706b comprises the image data 706 of the original image data captured by the second image sensor. In the embodiment of FIGS. 8-9, the spatially rearranging S1102 the original image data into spatially rearranged image data comprises switching 804 data corresponding to spatial positions of a lower left quadrant of the original image data and an upper right quadrant of the original image data.

The need of copying data between the first 708a and second 708b encoders for reference encoding is thus at least reduced. In some embodiments, the first 708a and second 708b encoders operate independently of each other as defined above.

It should be noted that the motion vector search performed for intra encoding of the image data portion 704a, 704b of the first encoder 708a may be adapted in view of the specific arrangement of data encoded by the encoder. For example, motion vector search for an upper part of the image data 704b may be done by also searching for similar image data in the lower part of the image data 704a (in a previously encoded image), etc., The motion vector search performed for intra encoding of image data portion 706a, 706b of the second encoder 708b may be adapted in a similar way.

The rearranged image data 802 is thus spatially split S1104 by the division line 710 to form the first image data portion 704a, 704b and the second image data portion 706a, 706b. In the example of FIGS. 8-9, the first and second encoders support encoding in slices and not encoding in tiles, wherein the division line 710 is spatially splitting the rearranged image data 802 in a horizontal direction. In other embodiments (not shown in the figures), the first and second encoders support encoding in tiles and not encoding in slices, wherein the division line is spatially splitting the rearranged image data in a vertical direction after spatial modification appropriate for that application. The first image data portion 704a, 704b is encoded S1106 by the first encoder 708a to form an encoded first image data portion 902a.

The second image data portion 706a, 706b is encoded S1108 by the second encoder 708b to form an encoded second image data portion 902b.

An auxiliary frame 916 is then formed by spatially joining S1110 the encoded first image data portion 902a and the encoded second image data portion 902b at the division line 710 and using the resulting joined image data as image data of the auxiliary frame 916.

In the example of FIG. 9, the image data of the auxiliary frame 916 comprises the encoded first image data portion 902a as a first slice, and the encoded second image data portion 902b as a second slice. In other setups, the image data of the auxiliary frame 916 may comprise the encoded first image data portion as a first tile, and the encoded second image data portion as a second tile.

The spatially joining S1110 of the encoded first image data portion 902a and the encoded second image data portion 902b may be performed by a stream multiplexer (not shown in FIG. 9), which for each image frame (original image data) receives the encoded first image data portion 902a and the encoded second image data portion 902b, and forms a joined encoded image data to be used as the image data of the auxiliary frame 916. The stream multiplexer may in some embodiments be a unit separate from the encoders 708a-b, and in other embodiments implemented in one of the first 708a and second 708b encoders.

To be able to restore the decoded image data back to the spatial arrangement of the original image data 702, motion vectors 908, 910, 912, 914 corresponding to a restoration of the image data of the auxiliary frame 916 back to a spatial arrangement of the original image data 702 are determined. Similar to what is described above for FIG. 2, for simplicity, in FIG. 9, the motion vectors 908, 910, 912, 914 are represented by constant motion vector regions, meaning that all motion vectors within a region are intended to be the same. An inter frame 918 referencing 906 the auxiliary frame 916 is encoded, where the determined motion vectors 908, 910, 912, 914 are used as motion vectors of the inter encoded frame 918 (which comprises no image data). As described above, the auxiliary frame 126 will not be directly decoded on a decoder side. Instead the image data 902a, 902b of the auxiliary frame 916 will be used in conjunction with data of the inter encoded frame 918 (the motion vectors 908, 910, 912, 914) to achieve image data to be shown.

In the embodiment of FIGS. 8-9, where the rearranging of the image data comprises switching data corresponding to spatial positions of a lower left quadrant of the original image data and an upper right quadrant of the original image data, the motion vectors are determined according to the following:

the motion vectors 908 corresponding to an upper left quadrant of the image data of the auxiliary frame are set to zero.

the motion vectors 910 corresponding to a lower left quadrant of the image data of the auxiliary frame are set to (w/2, −h/2) where w=the width of the original image data 702, and h=the height of the original image data 702.

the motion vectors 912 corresponding to an upper right quadrant of the image data of the auxiliary frame are set to (−w/2, h/2) where w=the width of the original image data 702, and h=the height of the original image data 702.

the motion vectors 914 corresponding to a lower right quadrant of the image data of the auxiliary frame are set to zero.

In case the rearranging S1102 of the image data is done differently, the determining of the motion vectors is adjusted in a corresponding fashion.

It should be noted that the setup of image sensors and the resulting arrangement of the original image data shown in FIGS. 8-9 are provided by way of example. Other setups are equally possible. For example, the original image data may be captured by four image sensors. In case two encoders are used, the rearranging of image data and determining of motion vectors may be performed as described above, but if, e.g., four encoders are used, the method needs to be adapted correspondingly.

Figure 10:
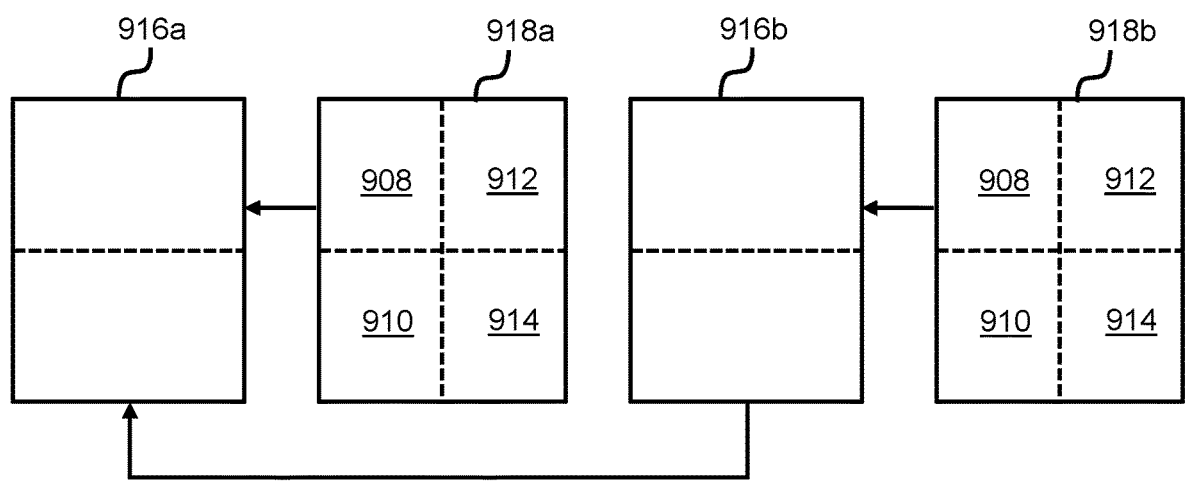
FIG. 10 shows an encoded video stream with a plurality of display frames and auxiliary frames encoded as shown in FIG. 9.
Figure 11:
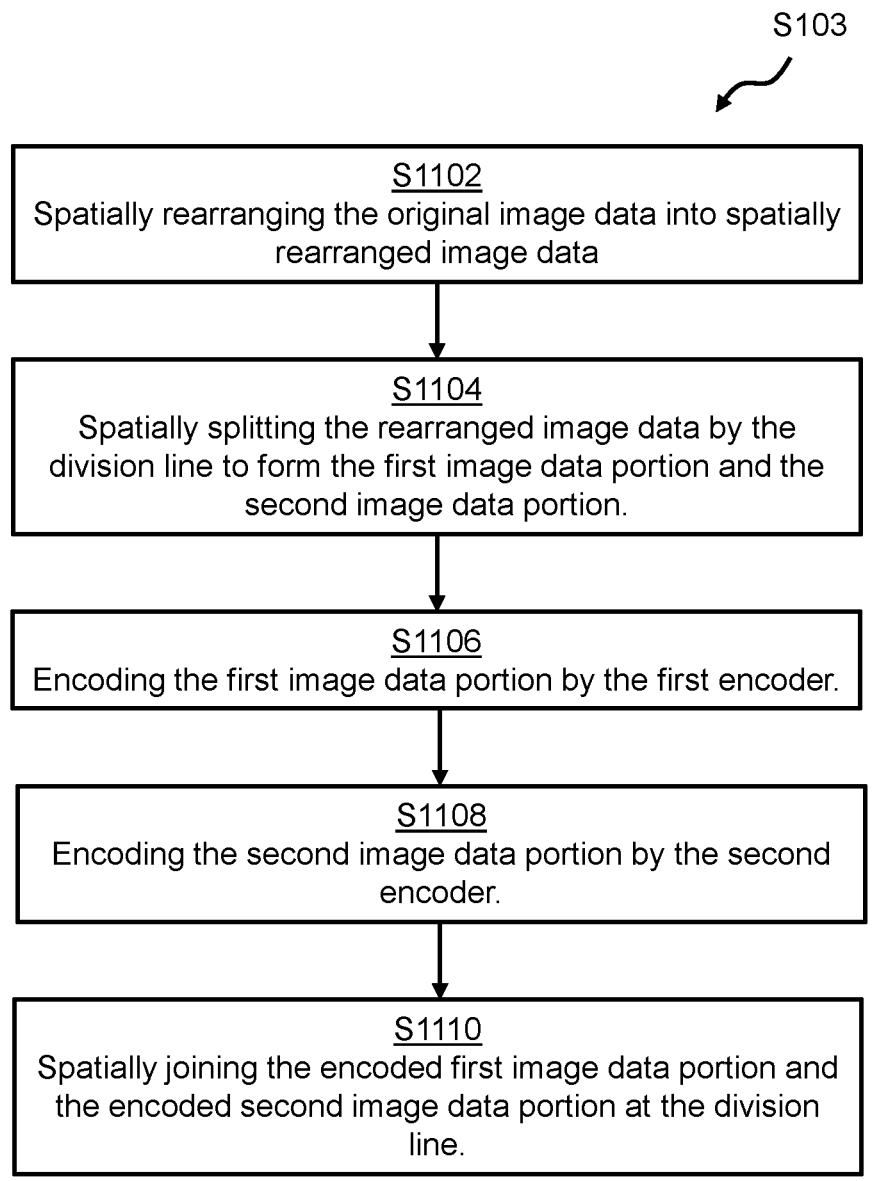
FIG. 11 shows an extension of the flow chart of FIG. 1, describing an embodiment of the inventive concept.

FIG. 10 schematically shows an encoded video stream with a plurality of (inter encoded) display frames 918a, 918b and auxiliary frames 916a, 916b. The determined motion vectors 908, 910, 912, 914 may be reused for all display frames 918a, 918b in such stream. The second auxiliary frame 916b is encoded as an inter encoded frame as described above in conjunction with FIGS. 8-9, referencing the first auxiliary frame 916a. The first auxiliary frame 916a may be inter encoded or intra encoded.

The encoding methods described in FIGS. 8-11 may be implemented in an encoding device comprising circuitry configured to perform the encoding methods. In one example, the methods above are carried out using a computer program product comprising a (non-transitory) computer-readable storage medium with instructions adapted to carry out the methods when executed by a device having processing capability.

In summary, the present invention relates to the field of image encoding. In particular, it relates to methods and devices where the concept of auxiliary frames may be employed to reduce or even remove the need of copying data, for reference encoding purposes, between encoders which encode different parts of an image frame. This purpose is achieved by spatially modifying original image data before encoding it using the encoders, and using the encoded image data as image data of an auxiliary frame. The auxiliary frame is referenced by an inter frame comprising motion vectors corresponding to a restoration of the auxiliary frame image data back to a spatial arrangement of the original image data.

Additionally, variations to the disclosed embodiments can be understood and effected by the skilled person in practicing the claimed invention, from a study of the drawings, the disclosure, and the appended claims. For example, in the description and drawings, two encoders are used. However, the encoding may be done splitting the image data into more than two slices or tiles, using more than two encoders. It should further be noted that the embodiments described herein may be combined in any suitable way. For example, a buffer region, as described in conjunction with FIGS. 2-6 may be included between the image data portion 704a and the image data portion 704b (encoded by the first encoder 708a) in FIG. 9. In this case, the motion vectors 918 need to be modified accordingly.

The invention claimed is:

1. A method for encoding a video stream in a video coding format, using a first encoder and a second encoder which operate independently of each other, each encoder having a motion vector search range for block matching, wherein the video coding format supports including an auxiliary frame in the encoded video stream, the auxiliary frame being referenced by another frame in the encoded video stream and comprising image data complementing said another frame, wherein the image data of the auxiliary frame is not intended to be shown when decoding the encoded video stream but instead used in conjunction with data of said another frame to achieve image data to be shown, the method comprising the steps of:
   receiving original image data captured by at least one image sensor;
   forming an auxiliary frame by modifying and encoding the original image data, wherein the auxiliary frame is formed by:
      spatially splitting the original image data by a division line, thereby forming a first image data portion of a first spatial region of the original image data and a second image data portion of a second spatial region of the original image data;
      encoding, by the first encoder, the first image data portion, wherein motion vector search in the first encoder is allowed to extend across the division line into a first virtual pixel region;
      encoding, by the second encoder, the second image data portion, wherein motion vector search in the second encoder is allowed to extend across the division line into a second virtual pixel region;
      providing an encoded buffer region of pixels, the buffer region having a size equal to at least a size of a largest of the first and second virtual pixel regions;
      wherein the first virtual pixel region, the second virtual pixel region and the buffer region comprise pixels with corresponding pixel values; and
      spatially joining the encoded first image data portion, the encoded second image data portion, and the encoded buffer region such that the encoded buffer region is sandwiched between the first and second image data portions, and using the joined encoded data as image data of the auxiliary frame,
   determining motion vectors corresponding to a restoration of the auxiliary frame image data back to a spatial arrangement of the original image data,
   encoding an inter frame referencing the auxiliary frame, wherein motion vectors of the inter frame correspond to the determined motion vectors.

2. The method of claim 1, wherein image data of the auxiliary frame comprises the encoded first image data portion as a first slice or tile, and the encoded second image data portion as a second slice or tile.

3. A method according to claim 1, wherein the division line is spatially splitting the original image data in a vertical direction, and wherein the step of determining motion vectors comprises:
   setting motion vectors corresponding to the original image data in the first image data portion to zero;
   setting a vertical component of motion vectors corresponding to the original image data in the second image data portion to zero; and
   setting a horizontal component of motion vectors corresponding to the original image data in the second image data portion to the width of the buffer region.

4. A method according to claim 1, wherein the division line is spatially splitting the original image data in a horizontal direction, wherein the step of determining motion vectors comprises:
   setting motion vectors corresponding to the original image data in the first image data portion to zero;
   setting a horizontal component of motion vectors corresponding to the original image data in the second image data portion to zero; and
   setting a vertical component of motion vectors corresponding to the original image data in the second image data portion to the height of the buffer region.

5. A method according to claim 1, wherein the corresponding value(s) of the pixels of the first virtual pixel region, the second virtual pixel region and the buffer region is determined by analyzing the original image data.

6. A method according to claim 1, wherein the corresponding value(s) of the pixels of the first virtual pixel region, the second virtual pixel region and the buffer region is predefined.

7. A method according to claim 1, wherein the size of the first virtual pixel region depends on a size of a motion search window of the first encoder, and wherein the size of the second virtual pixel region depends on a size of a motion search window of the second encoder.

8. A device for encoding a video stream in a video coding format, the device comprising a first encoder and a second encoder which operate independently of each other, each encoder having a motion vector search range for block matching, wherein the video coding format supports including an auxiliary frame in the encoded video stream, the auxiliary frame being referenced by another frame in the encoded video stream and comprising image data complementing said another frame, wherein the image data of the auxiliary frame is not intended to be shown when decoding the encoded video stream but instead used in conjunction with data of said another frame to achieve image data to be shown, the device comprising circuitry configured to:
    receive original image data captured by at least one image sensor;
    form an auxiliary frame by modifying and encoding the original image data, wherein the auxiliary frame is formed by:
        spatially splitting the original image data by a division line, thereby forming a first image data portion of a first spatial region of the original image data and a second image data portion of a second spatial region of the original image data;
        encoding, by the first encoder, the first image data portion, wherein motion vector search in the first encoder is allowed to extend across the division line into a first virtual pixel region;
        encoding, by the second encoder, the second image data portion, wherein motion vector search in the second encoder is allowed to extend across the division line into a second virtual pixel region;
        providing an encoded buffer region of pixels, the buffer region having a size equal to at least the size of a largest of the first and second virtual pixel regions, wherein the first virtual pixel region, the second virtual pixel region and the buffer region comprise pixels with corresponding pixel values;
        spatially joining the encoded first image data portion, the encoded second image data portion, and the encoded buffer region such that the encoded buffer region is sandwiched between the first and second image data portions, and using the joined encoded data as image data of the auxiliary frame;
    determine motion vectors corresponding to a restoration of the auxiliary frame image data back to a spatial arrangement of the original image data,
    encode an inter frame referencing the auxiliary frame, wherein motion vectors of the inter frame correspond to the determined motion vectors.

9. A method for encoding a video stream in a video coding format, using a first and a second encoder, wherein the video coding format supports including an auxiliary frame in the encoded video stream, the auxiliary frame being referenced by another frame in the encoded video stream and comprising image data complementing said another frame, wherein the image data of the auxiliary frame is not intended to be shown when decoding the encoded video stream but instead used in conjunction with data of said another frame to achieve image data to be shown, the method comprising the steps of:
    receiving original image data captured by at least a first image sensor and a second image sensor;
    forming an auxiliary frame by modifying and encoding the original image data, wherein the auxiliary frame is formed by:
        spatially rearranging the original image data into spatially rearranged image data, such that the rearranged image data can be spatially split by a division line, thereby forming a first image data portion of a first spatial region of the rearranged image data and second image data portion of a second spatial region of the rearranged image data, wherein the first image data portion comprises the image data of the original image data captured by the first image sensor, and wherein the second portion comprises the image data of the original image data captured by the second image sensor;
        spatially splitting the rearranged image data by the division line to form the first image data portion and the second image data portion;
        encoding, by the first encoder, the first image data portion;
        encoding, by the second encoder, the second image data portion;
        spatially joining the encoded first image data portion and the encoded second image data portion at the division line, and using the joined encoded data as image data of the auxiliary frame;
    determining motion vectors corresponding to a restoration of the auxiliary frame image data back to a spatial arrangement of the original image data,
    encoding an inter frame referencing the auxiliary frame, wherein motion vectors of the first frame correspond to the determined motion vectors.

10. The method of claim 9, wherein the first and second encoder operate independently of each other.

11. The method of claim 9, wherein image data of the auxiliary frame comprises the encoded first image data portion as a first slice or tile, and the encoded second image data portion as a second slice or tile.

12. The method of claim 9, wherein the first and second encoders support encoding in slices and not encoding in tiles, wherein the division line is spatially splitting the rearranged image data in a horizontal direction.

13. The method of claim 12, wherein the step of spatially rearranging the original image data into spatially rearranged image data comprises:
    switching data corresponding to spatial positions of a lower left quadrant of the original image data and an upper right quadrant of the original image data.

14. A device for encoding a video stream in a video coding format, the device comprising a first and a second encoder, wherein the video coding format supports including an auxiliary frame in the encoded video stream, the auxiliary frame being referenced by another frame in the encoded video stream and comprising image data complementing said another frame, wherein the image data of the auxiliary frame is not intended to be shown when decoding the encoded video stream but instead used in conjunction with data of said another frame to achieve image data to be shown, the device comprising circuitry configured to:
    receive original image data captured by at least a first image sensor and a second image sensor;
    form an auxiliary frame by modifying and encoding the original image data, wherein the auxiliary frame is formed by:
        spatially rearranging the original image data into spatially rearranged image data, such that the rearranged image data can be spatially split by a division line, thereby forming a first image data portion of a first spatial region of the rearranged image data and second image data portion of a second spatial region of the rearranged image data, wherein the first image data portion comprises the image data of the original image data captured by the first image sensor, and wherein the second portion comprises the image data of the original image data captured by the second image sensor;
        spatially splitting the rearranged image data by the division line to form the first image data portion and the second image data portion;

encoding, by the first encoder, the first image data portion;

encoding, by the second encoder, the second image data portion;

spatially joining the encoded first image data portion and the encoded second image data portion at the division line, and using the joined encoded data as image data of the auxiliary frame;

determine motion vectors corresponding to a restoration of the auxiliary frame image data back to a spatial arrangement of the original image data, encode an inter frame referencing the auxiliary frame, wherein motion vectors of the first frame correspond to the determined motion vectors.

15. A non-transitory computer program product comprising a computer-readable storage medium with instructions adapted to carry out the method of claim 1 when executed by a device having processing capability.

16. A non-transitory computer program product comprising a computer-readable storage medium with instructions adapted to carry out the method of claim 9 when executed by a device having processing capability.

* * * * *